June 20, 1950 W. G. KECK ET AL 2,511,855
THERMOELECTRIC FEEDBACK SYSTEM
Filed April 2, 1947 3 Sheets-Sheet 1
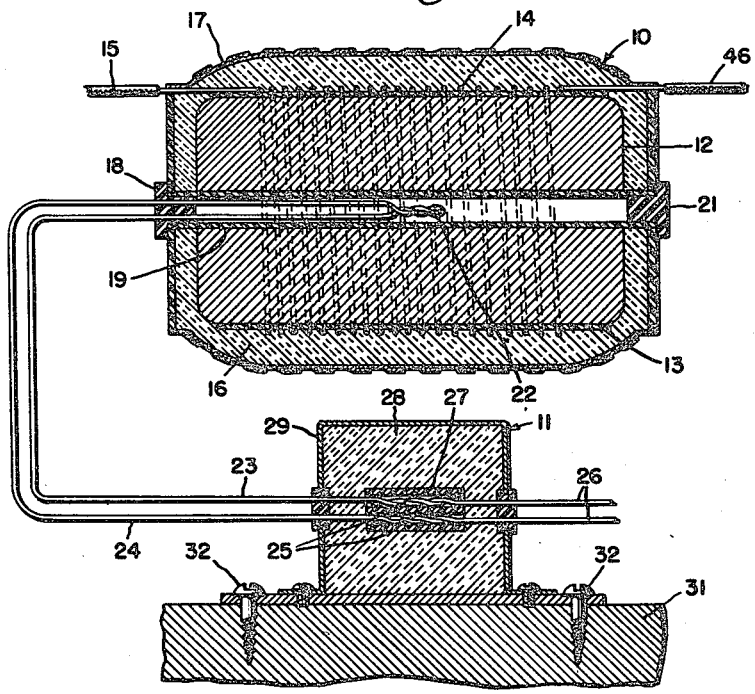
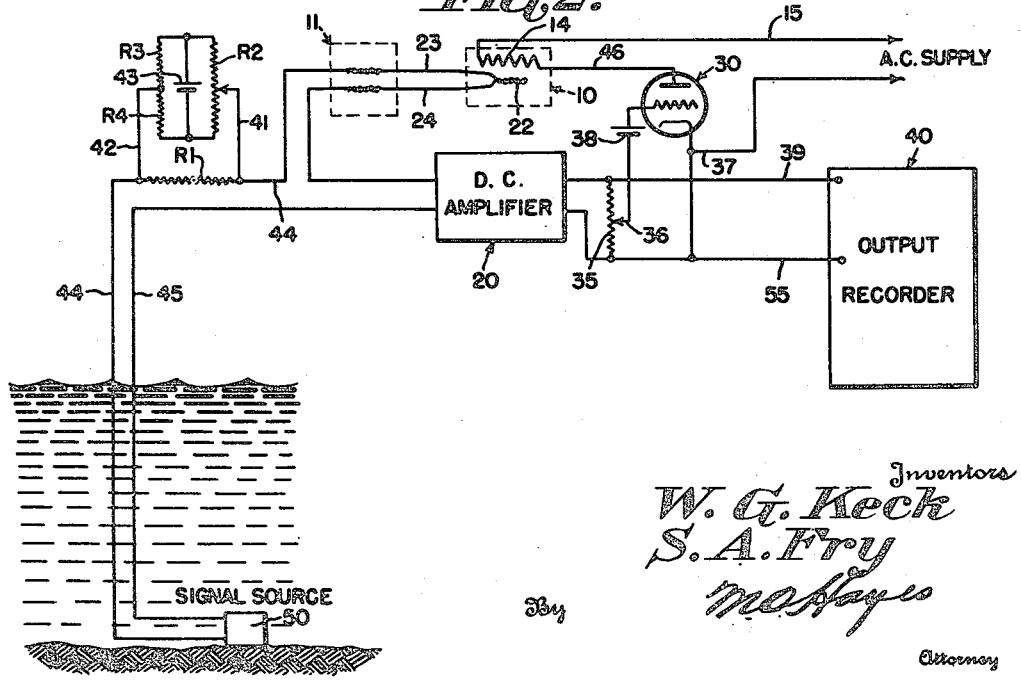
Inventors
W. G. Keck
S. A. Fry

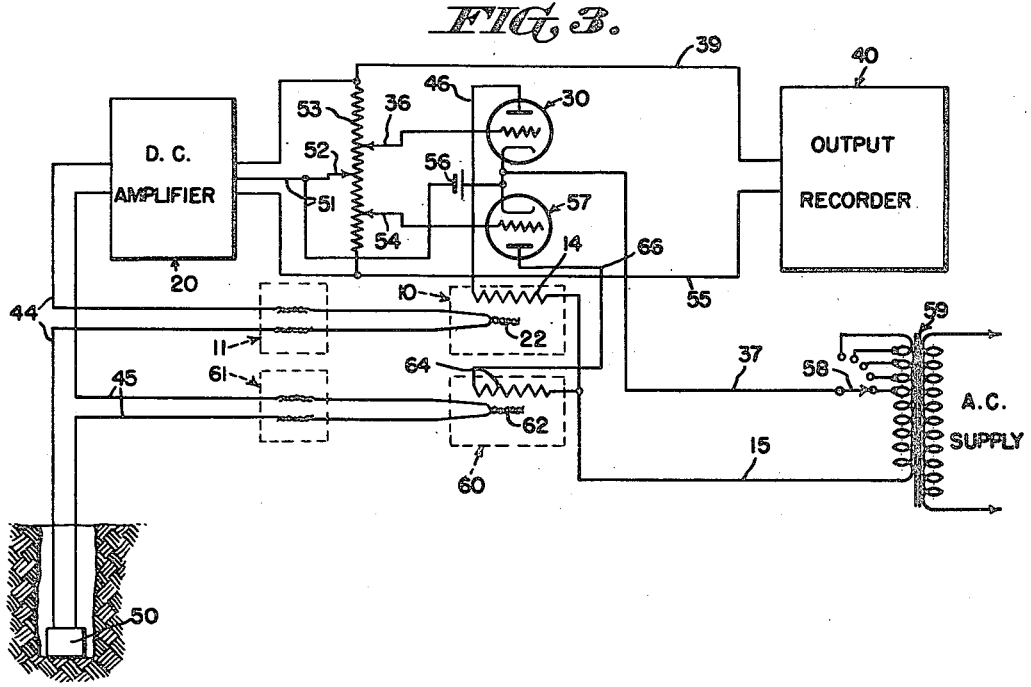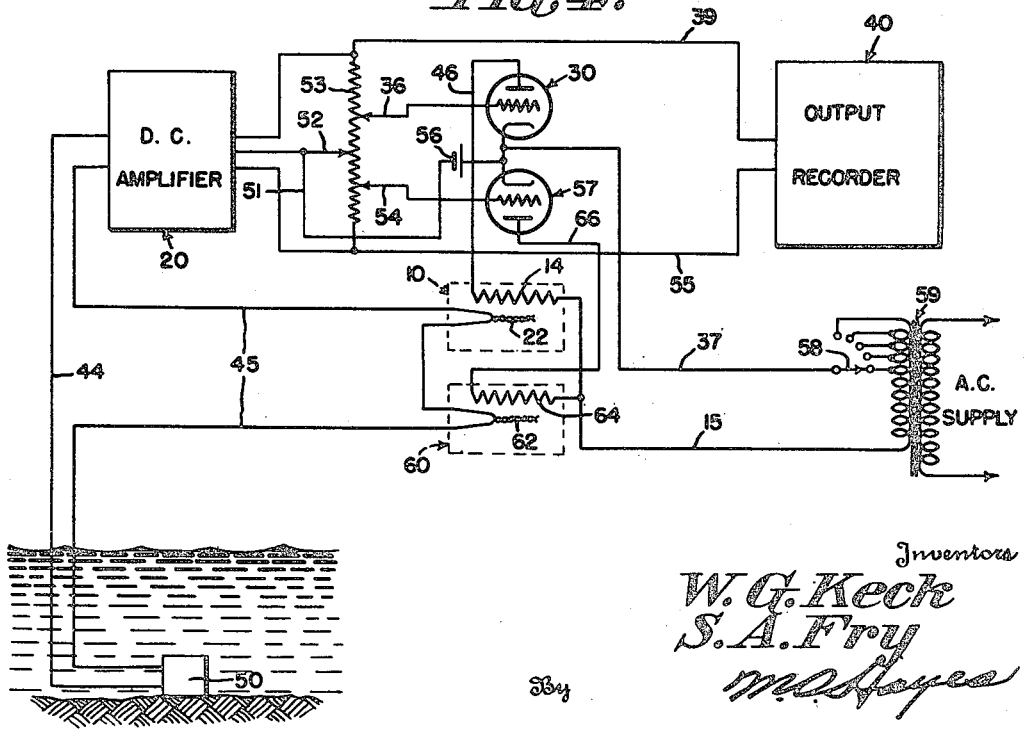

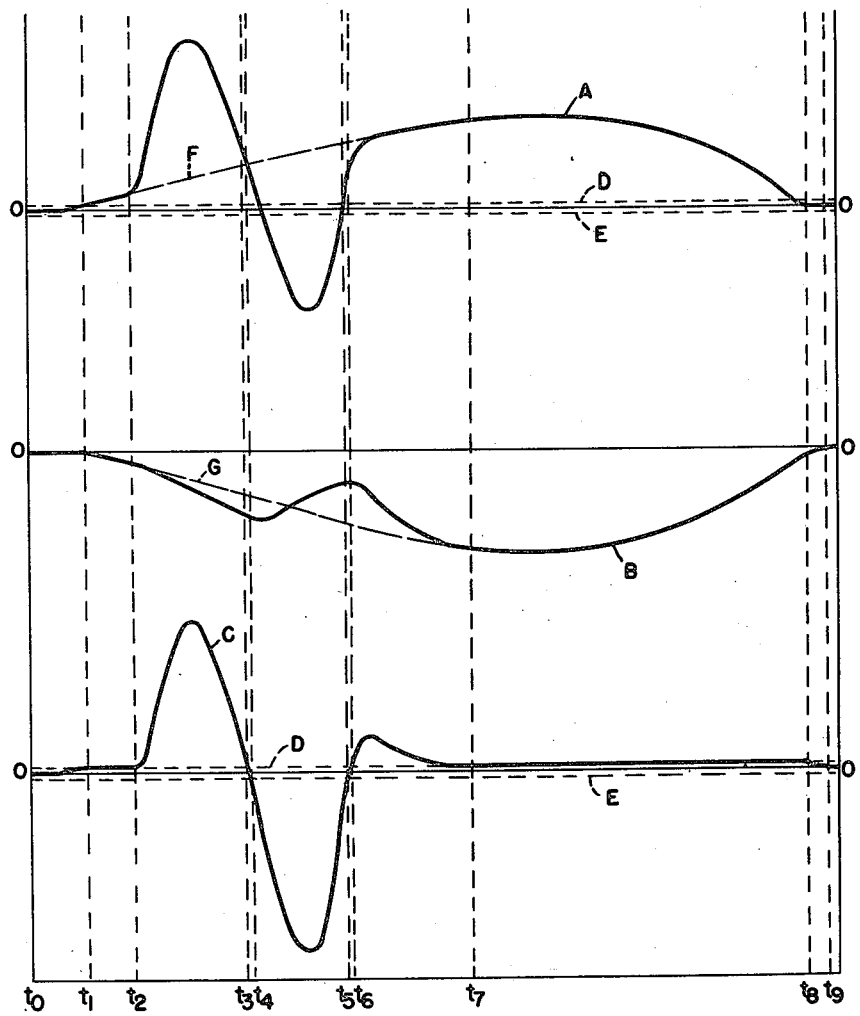

Patented June 20, 1950

2,511,855

UNITED STATES PATENT OFFICE 2,511,855

THERMOELECTRIC FEEDBACK SYSTEM

William G. Keck, East Lansing, Mich., and
Sam A. Fry, Portland, Oreg.

Application April 2, 1947, Serial No. 738,903

14 Claims. (Cl. 346—33)

(Granted under the act of March 3, 1883, as amended April 30, 1928; 370 O. G. 757)

This invention relates generally to stabilization of systems for detecting, amplifying and electrically recording signals corresponding to changes in physical phenomena. More specifically, the invention relates to means for preventing the recordation of spurious signals due to long period variations in the measured phenomena which would otherwise be recorded as drift in the zero or null position of the recording instrument.

In the recording of changing physical conditions such as underwater potentials, magnetic signals and the like, it is the usual practice to place a sensitive detector in the region to be tested or explored. When the signals thus detected are minute it is common practice to employ an amplifier for the signal and to feed the amplified signal into a recording device. The leads from the detector to the amplifier are in some cases quite long in order to permit location of the amplifier and recording apparatus on the shore or on the surface when subterranean or subaqueous measurements are being made. These leads disposed within a body of water may be the source of spurious signals and the occurrence of long period changes in the physical conditions surrounding the detectors may give rise to the detection and amplification of signals unrelated to the phenomena under measurement. This may be due to tidal movements of the water when measuring underwater phenomena or to long period earth potentials when measuring subterranean conditions. Furthermore, for recording of low frequency signals the use of a direct current amplifier is normally required. Such amplifiers are themselves a source of signals of long period which may be recorded as drift of the recording element.

These disturbing signals may be very slow and may last for a period of many hours so that the recorder trace is displaced from the normal zero or null position for long periods of time and, in addition, may be slowly but continuously changing position. This condition is referred to herein as drift. Frequent manual adjustment has been necessary heretofore in continuous recording systems to compensate for drift so that the recorder trace will be at or near the zero position whenever a changing condition which it is desired to record occurs.

This invention utilizes the long time lag of a heated thermocouple system for feeding a compensating signal back into the detector circuit in opposition to the long period spurious signals whereby such signals are minimized while signals of shorter duration, such as are characteristic of the changing conditions under measurement, are transmitted to the amplifier, amplified and recorded.

One of the objects of the present invention is to provide a new and improved system for recording signals selectively in accordance with a frequency characteristic of the signals.

Another object in the provision of new and improved means for normally maintaining the recorder trace of a detecting and recording system at or near a predetermined zero position regardless of the occurrence and detection of signals of relatively long duration.

Another object is the provision of a feedback signal for compensating for long period signals detected.

A further object is to provide in a feedback system means for detecting, amplifying, and recording signals of a desired duration or rate of change and cancelling signals of a longer duration or slower rate of change.

A further object is the provision of means for preventing drift of the recording instrument caused by low frequency signals detected by the detector.

Other objects, features and advantages of the invention will be apparent from the drawings and following description. For a more complete understanding of the subject matter and objects of the invention reference should be had to the following detailed description, taken in connection with the accompanying drawings, of which:

Fig. 1 is a sectional view of a thermocouple heater element suitable for use with this invention;

Fig. 2 is a schematic diagram of a complete detecting and recording system illustrating the invention and employing one electrically heated thermal element;

Fig. 3 is a schematic diagram of a complete system employing two heated thermal elements;

Fig. 4 is a schematic diagram of an alternative complete system similar to the system of Fig. 3 in which the specific cold junctions of Fig. 3 are not employed; and Fig. 5 is a graphical representation of the operation of the systems of Figs. 3 and 4.

Referring to the drawings on which like numerals of reference are employed to designate like parts throughout the several views, and more particularly to Fig. 1 thereof, the numeral 10 generally designates a thermocouple heating element, the cold junction of which is designated generally by the numeral 11. The numeral 12 designates a cylinder of copper, silver, or other material of high thermal conductivity and high thermal capacity enclosing a thermocouple junction and suitable for absorbing a quantity of heat in accordance with specific requirements of the system. The insulation 13 may conveniently be in the form of ceramic tubing, glass tape, or other electrical insulating material suitable for the purpose which will withstand the heat applied thereto when the heater coil 14 is energized. The heater coil 14 may be of any convenient design wound closely about the insulation 13 and having the winding thereof designed in accordance with the rate of heating it is desired to apply to the cylinder 12 as required for any particular application of this invention. By varying the number of turns of the coil 14, and by selecting the size or resistance of the wire of which the coil is composed, a wide variation is obtainable in the rate of heating applied to the cylinder for any desired source of power from which the coil is to be energized.

The heater coil 14 is conveniently connected to an A.-C. power supply by means of the lead 15 which are shown emerging centrally from one end of the element 10. The manner of applying power to the coil will be more fully described hereinafter. When the coil is energized, the winding thereof is heated and the heat is transferred through the electrical insulation 13 to the cylinder 12. The cylinder has a relatively high specific heat and is made of sufficient mass of material so that the rise in temperature thereof as the coil is energized takes place slowly. The cylinder thus serves as a heat reservoir which fills slowly as the temperature thereof rises. This provides a delay time between the initiation of the heating current and the effect thereof in raising the temperature of the reservoir. The thermal insulation 16 is provided for the purpose of retaining in the reservoir the heat which has been introduced therein, with gradual loss of heat when the heating current is discontinued. The amount of insulating material used may be varied at will so as to provide a cooling curve of the desired characteristic, ordinarily having the cooling rate equal to the heating rate when coil 14 is energized. The thermal insulation may conveniently be protected by a wrapping of tape such as 17.

The cylinder 12 is provided with a central bore 19 being of size suitable for admitting the thermocouple leads 23 and 24 and the thermal junction 22. The leads 23 and 24 pass through an insulating plug such as 18 which separates the wires within the bore 19, and is composed of heat resistant material. Any suitable materials may be used for the thermocouple 22 and the leads 23 and 24, for example, copper and constantan wire. The junction 22 is arranged centrally within the cylinder 12, and the insulator 18 and the plug 21 prevent substantial loss of heat from the ends of the bore 19.

A cold junction housing is indicated generally by 11, within which leads 23 and 24 connect to the copper leads 26. If leads 23 and 26 are composed of copper the temperature thereof is of no consequence, but the temperature of the junction of the dissimilar metal wire 24 and the copper lead 26 should be maintained approximately constant. This is accomplished by providing insulation such as glass wool 28, or the like, around the junctions and within the cover 29, secured to any suitable base 31 as by the screws 32. The junctions of the leads are insulated as at 27. The cold junction 25 thus formed is at the average temperature of the surrounding air and is protected from sudden air changes.

It follows from the construction of the heater element and the foregoing description that the thermocouple junction 22 will be heated above the temperature of the junction 25 whenever the coil 14 is energized but that the heating of the junction 22 will lag behind the current in the coil, and that in cooling of the element after discontinuance of the current in the coil 14 the junction remains heated for a time so that rapid changes in thermocouple-developed E. M. F. will not occur. Thus when the coil 14 is energized at frequent intervals a fairly steady E. M. F. is maintained in the leads 26 of the thermocouple system, the magnitude of which varies with the duration and frequency of energization of the coil.

Fig. 2 represents in diagrammatic form a detecting and recording system employing the thermoelectric system of Fig. 1 for the purpose of feeding a voltage into the input of a D.-C. amplifier in series with the signal detected by the detector. In this system 20 designates the amplifier, which may be either of the D.-C. or chopper type, but is shown as a simple D.-C. amplifier. The junction 22 is shown in series with one of the leads from the signal source 50, and is connected in polarity such that the thermocouple voltage opposes the voltage generated in the signal source when that voltage is of a given sign, which, for convenience, will be referred to herein as positive. The E. M. F. injected in the circuit by the thermocouple 22 is herein regarded as negative and is variable between zero and a predetermined maximum in accordance with the particular maximum difference of temperature between the junctions 22 and 25 corresponding to maximum heating applied by the coil 14.

The spurious long period signals, or drift, arising within the detecting and amplifying circuit may be of either sign, only the positive values of which are opposed by the negative feedback from the thermocouple 22. With the arrangement of Fig. 2 a bias potential of preset constant magnitude is introduced into the detector circuit whereby negative drift is overcome. This is accomplished by battery 43, the resistance network $R_2$, $R_3$ and $R_4$, the lead 42, the slide wire connection 41, and the resistance $R_1$ which is in series with the lead 44. The resistance $R_1$ is selected to have a value sufficiently low with respect to the impedance of the detector or signal source 50 and the amplifier 20 so that signals which it is desired to amplify and record are passed through $R_1$ with relatively small loss. By adjusting the connection of 41 at $R_2$ a voltage of positive sign is continuously applied across $R_1$ as is well known in the electrical art. The magnitude of this voltage is preferably set at a value approximating one half of the maximum negative voltage injected by the thermocouple when operating at capacity. Thereby the combination of positive bias voltage and negative injected voltage may be varied by control of the injected voltage, between the aforesaid positive bias voltage and a negative voltage of substantially the same value, which is the thermocouple voltage (negative) plus the positive bias voltage.

In Fig. 2 the output of amplifier 20 is shown connected to a recording device 40 by leads 39 and 55. The recording device may be any of a number of well known commercial recorders suitable for recording continuously the current or voltage signals received thereby.

Potential divider 35 is shown connected across output leads 39 and 55. The sliding connection 36 is adjusted to a position such that when a signal is applied to the amplifier 20 the positive voltage output of the amplifier impressed across leads 39 and 55 and potential divider 35 is tapped at a level suitable for initiating conduction in the thyratron 30, the grid of which is connected to sliding connection 36. This thyratron becomes conducting whenever the voltage at 36 exceeds the threshold value characteristic of that tube, as is well known in the electronic art.

When the tube 30 becomes conducting by virtue of a positive signal exceeding the threshold value it continues to conduct until the positive signal from the amplifier drops below this value. The A.-C. power supply for the coil 14 is impressed across the cathode to plate of tube 30 and, therefore, the tube will conduct only during positive portions of the voltage cycle. Thus the tube is extinguished and started successively with each cycle during such time as the aforesaid threshold voltage is maintained at the grid. If the grid voltage falls below the threshold value during any conducting interval, the tube remains conducting thereafter until the positive half of the power supply voltage cycle decreases below that necessary to maintain the discharge in the tube 30. The succeeding positive half cycle does not result in power flow to coil 14 for the reason that the grid voltage is too low to initiate a discharge. However, as soon as the voltage at the grid again exceeds the threshold value, a new series of conducting cycles occurs in the tube 30 which in turn is terminated by a drop in the grid voltage below the threshold value.

It is thus seen that the tube 30 is conducting in successive half cycles of positive voltage when, and only when, the grid is maintained at a potential exceeding a predetermined value.

The threshold voltage required for conduction in tube 30 may be varied by selection of a thyratron for the particular value desired. Furthermore, any suitable bias potential 38 may be introduced between the grid and the connection 36, according to well known practice, in order that the tube 30 will begin conducting at the desired value of signal voltage.

In accordance with the invention, if no input bias voltage is employed, when a signal of long duration or slow rate of change is detected, e. g., a positive drift, the initial portion of the signal is amplified and the amplified signal is impressed on the recorder leads and on the potential divider 35. When such an amplified signal builds up to a predetermined small value such that the grid of the tube 30 connected at 36 to the voltage divider by way of battery 38 is at its threshold voltage, the tube conducts and the heater coil is energized. When this occurs, the temperature of the thermal junction 22 gradually rises until the negative voltage injected by the thermocouple into the input circuit of the amplifier substantially equals the voltage of the detected signal and thereby reduces the amplified signal to a value such that the potential of the grid is below the threshold voltage of the tube, thereby causing the tube to be extinguished and interrupt the current to the heater coil.

When the recorder system is likely to encounter both positive and negative drift, a positive bias voltage for compensation of the negative drift may be employed in the input as shown on Fig. 2 and hereinbefore described. Such a positive bias in the detecting circuit is the electrical equivalent of a steady drift signal of positive polarity from the signal source and is of appropriate sign to cause conduction in tube 30. When the injected voltage from the thermocouple has built up to the selected bias voltage value, the two voltages, being of opposite sign, cancel or compensate and no voltage is received or amplified by the amplifier. Tube 30 extinguishes, the thermal element begins to cool and the injected voltage begins to decrease. This reestablishes a positive amplified signal which causes reoperation of tube 30 and renewed heating of the thermal element and this procedure repeats as often as necessary to keep the amplified signal at or below the value required for triggering tube 30. The thermally injected voltage changes slowly and the resulting effect upon the recorded signal is negligible.

The addition of a positive drift voltage to the positive bias voltage requires a larger compensating negative injected voltage. This is supplied by the higher temperature of the thermal element at which the heater coil is cut off, and the tube 30 conducts for somewhat longer intervals, or more frequently, in order that the higher temperature of the thermal element may be maintained despite a higher heat loss. Conversely, when a negative drift occurs it subtracts from the bias voltage and the tube 30 conducts less frequently or for shorter intervals and the temperature of the thermal element is maintained at a lower value such that the injected voltage compensates for combined bias and drift.

When, however, a signal of short duration and high rate of change is detected, the tube 30 causes increased gradual heating of the thermal element for positive signals and decreased heating for negative signals but, due to the temperature lag and slow change in temperature of the thermocouple element, the detected signal is amplified and recorded without substantial distortion thereof as the result of the variation in the injected voltage. The small change in injected voltage resulting from the short period of increased or decreased heating occurs at a sufficiently slow rate as not to cause appreciable deviation of the recording element from the true signal position thereof, and only the long period signals are substantially compensated. The device thus selectively records signals of a desired frequency range or rate of change according to the predetermined thermal characteristics of the thermal element and the settings of the variable resistors of the system, and filters out or compensates for signals of lower frequency or a lower rate of change.

In Fig. 3 is shown a preferred form of the invention in which two thyratrons are employed to control the heating of two thermocouples, one for compensation of negative drift and the other for compensation of the positive drift. The invention according to this illustration employs an amplifier having "push-pull" output in place of the simple D.-C. amplifier illustrated in Fig. 2. Either type amplifier may be used in either of the foregoing embodiments at the option of the user except for minor changes in the output circuit which will be obvious to those skilled in the art. In Fig. 3 the amplifier output is shown connected to the recorder or output recording meter 40 as in Fig. 2 by way of leads 39 and 55, and a center lead 51 is added in connection with the "push-pull" output of the amplifier. The lead 51 connects by way of sliding connection 52 to the potential divider 53 which is connected across leads 39 and 55.

When an amplifier is employed as illustrated in Fig. 3 there is normally a D.-C. current of positive polarity flowing at all times from lead 39 through the sliding connection 52 to lead 51 by way of a portion of the potential divider 53, and a D.-C. current of positive polarity flowing at all times from lead 55 through the connection 52 to lead 51 by way of another portion of the divider 53. When the input of the amplifier is nil the two leads 39 and 55 are at the same potential with respect to 51 and no voltage appears at the recorder 40. However, when there is a signal of positive sign at the input of the amplifier the lead 39 becomes more positive in accordance with the strength of the amplified signal and the lead 55 becomes correspondingly less positive. Conversely, a negative signal input causes lead 55 to be increased in potential while lead 39 is decreased. Thus the relative strength of positive output currents from the two sides of the amplifier at 39 and 55 control the operation of the recorder and bias voltages, as required, may be taken from divider 53 at connections 36 and 54.

The thyratron 30 is connected into the circuit in a manner similar to that hereinbefore described, lead 37 connecting the cathode thereof to one side of the A.-C. power supply, lead 46 connecting the plate to the other side of the power supply through the heater coil 14. The grid is connected by sliding connection 36 to the potential divider 53. A second thyratron 57 is connected to the amplifier in the same manner as the thyratron 30, the cathodes of the two thyratrons being connected together and to lead 37. The center lead 51 from the amplifier is also connected to the cathodes of the thyratrons preferably by way of the bias battery 56 whereby the grids may be made negative. The thyratron 57 has the grid thereof connected to the amplifier through the sliding connection 54 on the potential divider 53. It will be noted that the connections 36 and 54 are on opposite sides of the connection 52 such that the grids become alternatively more positive depending on which of the leads 39 or 55 is of higher potential.

In an amplifier having "push-pull" output, a positive signal, when amplified, may be caused to produce a positive signal between the output lead 39 and the center lead, and a negative signal between the center lead and the lead 55. In that event when the amplified signal is of the negative sign the lead 55 is of positive sign and the lead 39 of negative sign with respect to the center lead 51. Thus a signal of either sign and of sufficient magnitude results in making one of the tubes 30 or 57 conducting, depending on the sign of the signal amplified.

When thyratron 57 receives a sufficient positive signal by way of lead 55, potential divider 53, and the connection 54, current flows through the tube 57 by way of conductor 66, heater coil 64 and lead 15 to the power supply as at switch 58 and transformer 59. In this manner the thermal element, generally referred to as 60, and junction 62 thereof, are heated at a rate variable by selection of a suitable power supply voltage.

The flow of current in the coil 14 or the coil 64, as the case may be, causes a difference of temperature between the thermocouple junction 22 and the cold junction 11 or between the thermocouple junction 62 and the cold junction 61, depending upon which coil is heated. When a positive signal is amplified and tube 30 conducts, junction 22 is heated and a negative potential is introduced in the input line from the source 50 to the amplifier, lead 44 being connected to the amplifier through cold junction 11 and the junction 22 as in the case of Fig. 2. When a negative signal is amplified and causes the tube 57 to conduct and the thermocouple junction 62 is heated, a positive signal is introduced or injected in the input from the source 50 to the amplifier, the lead 45 being connected through the junction 61 and the thermocouple junction 62 in a manner similar to the introduction of the negative signal in the line represented by the leads 44.

If desired, junctions 22 and 62 may be both placed in the line comprising the leads 44 or in the line comprising the leads 45, as illustrated in Fig. 4 and junctions 11 and 61 may be omitted by connecting a single length of constantan wire at 22 and 62 to the copper leads thereof. By this arrangement 62 becomes the cold junction whenever junction 22 is heated and junction 22 becomes the cold junction when junction 62 is heated. The magnitude of the injected voltage will be proportional to the difference in temperature between 22 and 62, and it is unimportant, within a wide range of temperatures, what the exact temperature of the cold junction may be. The device of Fig. 4 operates in the same manner as the device of Fig. 3 except for the omission of the two constant temperature junctions. Both junctions 22 and 62 are in the same lead from the signal source and the sum of the injected voltages from junctions 22 and 62 may be positive or negative, depending on which junction is of higher temperature.

Tubes 30 and 57 are normally biased to cut off in the absence of a signal and a small rise in the voltage at the grids of tubes 30 and 57 corresponding to their threshold values is required in order to initiate conduction therein. The relation of amplified signal voltage to rise in grid voltage required to operate the thyratrons may be controlled by the potential taken from the battery 56 or by adjustment of sliding connections 36 and 54, or both. In practice it may be desirable, for example, to initiate the conduction in tube 30 when the input signal reaches 2 microvolts positive. The initiation of conduction in the tube 57 is conveniently adjusted to the same value of input signal, except that it operates on signals of negative sign.

In Fig. 5 there is shown in graph form the operation of the preferred form of the invention shown in Fig. 3 in which curve A represents the detection of a signal, for example, a voltage signal, having positive and negative portions to which is added a drift signal of much lower rate of change or frequency. Curve B represents the voltage injected as a result of the operation of tubes 30 and 57. Curve C represents the sum of curves A and B, and is the signal seen and recorded by the recorder in which the drift has been substantially removed. The dotted lines D and E represent signals, which, when amplified, provide threshold voltage for the tubes 30 and 57 and which are normally adjusted to a low value with respect to the signals to be recorded. The broken line F represents the portion of the signal of curve A which is due to the drift signal during the recording of the true signal. The broken line G represents the compensating signal which would have been injected in compensation of the drift F if no true signal had been received. The amplitudes of the detected, the injected and the resultant input signals are shown in Fig. 5 as the ordinates of the curves, taken with respect to the lines 0—0. The abscissas represent time from $t_0$, in which all curves are drawn to the same time scale.

At $t_0$ in the case represented no signal is detected. The detection of a slowly varying voltage signal which produces threshold voltage on tube 30 is shown by the curve A crossing line D at $t_1$. Tube 30 becomes conducting on positive half cycles of power supply voltage at that instant and coil 14 is energized. Reservoir 12 heats and thermal junction 22 is heated, thereby causing a rising negative voltage to be injected into the detector circuit, which increases in value until such injected voltage, curve B, approaches the value of signal voltage detected and thus reduces the input voltage C and thereby the amplified voltage (not shown) to threshold value. Tube 30 does not again conduct until the threshold voltage is again exceeded because of increasing input voltage.

This cycle repeats as often as required to maintain an injected voltage closely approximating the drift voltage and an amplified voltage near threshold value. The nonconducting intervals are short and the thermal capacity of the element 10 effectively smooths the curve B sufficiently to conceal the intervals of heating and cooling of the junction 22. Curve B is of slightly smaller value than curve A such that the compensated signal or input voltage represented by curve C, remains nearly constant and follows line D.

In the case assumed, a signal of rapidly changing character is represented as being detected by the detector at $t_2$ and is shown by curve A. The rising amplified signal now causes further operation of tube 30 and the injected voltage B increases at its maximum rate in accordance with a selected initial design of the element 10 and the settings made at the bias controls, but the injected voltage is inadequate to follow the rapid changes of detected voltage. The maximum rate of change of injected voltage is shown between $t_2$ and $t_3$ on curve B and the unopposed component of detected voltage appears as a true signal closely approximated by curve C. The heating of element 10 ceases when curve C crosses line D as at $t_3$.

When curve C crosses line E because of a negative input signal, as at $t_4$, tube 57 becomes conducting by virtue of the bias thereof exceeding the threshold value for the tube, and the heating of coil 64 is initiated. As element 60 rises in temperature, junction 62 thereof builds up a positive voltage which is injected in opposition to the negative signal and to the negative injected voltage. Furthermore, the negative injected voltage decreases by virtue of cooling of element 10 thus further decreasing the injected negative voltage at a rate which is maximum for the design and settings selected for the apparatus. This is shown in curve B between $t_4$ and $t_5$.

A small time lag between the triggering of tubes 30 and 57 and the resulting changes in injected voltage is due to the thermal conductivity lag in the heat reservoirs of elements 10 and 60.

The heat developed in element 10 between $t_1$ and $t_3$ exceeds the heat developed in the element 60, since the heating time is greater for the signal represented by A, and the negative voltage of junction 22 plus the positive voltage of junction 62 leaves a resultant injected negative voltage when the curve C again crosses lines E and D at $t_5$ and $t_6$. At $t_5$ tube 57 extinguishes. At $t_6$ tube 30 resumes operation which continues to cause heating of element 10 until the sum of the injected voltages equals the voltage of curve A, as at $t_7$. Between $t_6$ and $t_7$ the element 60 is gradually cooling and the heating of the element 10 establishes a resultant negative injected voltage equal to the signal voltage at $t_7$.

When only slowly changing voltages are detected, tube 30 operates for short intervals whenever the threshold voltage is exceeded and curve C therefore follows line D. If the drift voltage disappears as at $t_8$ the injected voltage approaches zero as the junction 22 cools to ambient temperature as at $t_9$.

If a negative drift voltage is detected, a positive voltage will be injected by tube 57 as required to null or compensate therefor, and the curve C will follow the line E representing the signal for threshold voltage at tube 57. Signals smaller in value than D or E will be recorded as variations in curve C between lines D and E. The values D and E may be made as small as desired by adjusting the grid bias of the tubes.

Whereas, curve A represents a drift and a true signal having somewhat different rates of change, a much greater difference in rates of change or frequency is ordinarily encountered. The heating and cooling of the thermal elements is in such cases ordinarily made much slower with respect to the true signals and the effect of the changes in injected voltage during the recording of the true signal is minimized. Fig. 5 represents a relatively close discrimination between signals recorded and signals filtered out.

In operation this invention is seen to provide the characteristics of a filter which prevents amplification and recording of very low frequency signals while amplifying and recording signals of higher frequency. It has been found, for example, in the use of this invention that signals of duration of several minutes may be successfully recorded while signals lasting several hours such, for example, as signals due to tides or diurnal variations are successfully eliminated. Similarly, signals of one second duration may be recorded and signals of ten seconds duration eliminated. A high degree of discrimination between signals differing in duration by a factor of two may also be obtained by designing the thermal elements so that the heating and cooling curves for the thermal elements are of suitable slope less than that of the curves representing the detected signals. When close discrimination is desired the rate of heating of the thermocouples is carefully adjusted to a rate substantially below that necessary to oppose the signal voltage with an equivalent injected voltage, and the thermal insulation is varied until the cooling rate approximates the heating rate throughout the operating temperature range.

While Fig. 3 represents an embodiment of the invention which has been found to operate successfully, other arrangements employing the invention have been found advantageous for particular uses, as in Figs. 2 and 4. The recorder herein employed for illustration purposes records both positive and negative signals. By employing a rectifier circuit in the input thereof the recorder may be employed for magnitude recordings without regard to sign of the signal, and full scale deflections corresponding to signals of either sign may thus be obtained on the records. A number of circuits for this purpose are well known and, therefore, do not require further description in connection with this invention.

The particular form of the thermal elements represented by 10 and 60 is illustrative only. For example, it has been found convenient to mount the thermal elements on conventional radio tube bases or within a conventional tube envelope, the connections thereto being made by the tube prongs in any conventional tube socket. In that event the cold junction represented generally by 11 may be omitted since the connections are made at the tube prongs within the sockets, and the sockets may be protected from rapid changes in temperature in any convenient manner. The degree of insulation about the cold junction is not critical because of the manner in which the feedback is applied, which produces whatever injected voltage is required, within the capacity of the element, to cancel the long period signals regardless of the degree of heating necessary and regardless of the fortuitous temperature of the effective cold junction. The device is thus self-regulating over wide ranges of operation and for a variety of constructional arrangements and physical parameters.

While the invention has been described with reference to a particular example which gives satisfactory results, it will be apparent to those skilled in the art to which the invention pertains, after understanding the invention, that various changes and modifications may be made without departing from the spirit and scope of the invention and it is intended, therefore, in the appended claims to cover all such changes and modifications.

The invention herein described and claimed may be manufactured and used by or for the Government of the United States of America for governmental purposes without the payment of any royalties thereon or therefor.

What is claimed as new and desired to be secured by Letters Patent of the United States is:

1. In a recording system of the character disclosed, a recording device having a moveable element adapted to record signals received by the device, a direct current amplifier, an output circuit for said amplifier operatively connected to said device, an electronic device operatively connected to said output circuit, means electrically connected to said output circuit for selectively controlling said electronic device by signals received from the amplifier, a thermoelectric device controlled by said electronic device and adapted to generate a voltage of gradually increasing value while the electronic device is operated, a source of electrical signals of different frequencies, an input circuit for said amplifier having said signal source included therein, and means in said input circuit for connecting the voltage generating device in series opposition with said signal source whereby signals of less than a predetermined low frequency received from the source are compensated by said voltage.

2. A detecting and recording system comprising in combination, a detector for generating first electrical signals in response to changing physical conditions, a direct current amplifier operatively connected to said detector, a pair of thermocouple junctions connected in series with the detector and the amplifier, electrical means for differentially heating the first of said junctions above the temperature of the other of said junctions whereby second electrical signals are generated respectively in opposition to said first signals, heat absorbing and heat insulating means disposed about said first junction for delaying for a predetermined period of time the response of the first junction to the heating applied thereto by said heating means, an electronic device operatively connected to said electrical heating means and adapted to apply current thereto variably in accordance with the potential applied to a control element thereof, settable means connected to the output of said amplifier for applying a control voltage to said control elements selectively in accordance with the setting of said settable means for controlling the degree of said differential heating whereby each of said first electrical signals of substantially longer duration than said predetermined time is effectively bucked by a corresponding second signal and electrical signals generated by said detector and of substantially shorter duration than said predetermined time are amplified by the amplifier, and an electrical signal recorder operatively connected to the output of the amplifier for recording the amplified signals.

3. In a control circuit for preventing drift of a recording device, a detector element adapted to detect changes in the ambient field and generate variable direct current voltages corresponding thereto, an amplifier operatively connected to said detector and adapted to amplify said voltages, a recording device operatively connected to the output circuit of said amplifier and adapted to record the amplified signals, a valve circuit having an electronic current control device therein and including a heater coil connected to an A.-C. power supply, a thermocouple connected in series with the detector element and with the amplifier and having one junction of the thermocouple at substantially constant temperature and the other junction thereof enclosed within the heater coil whereby voltages are generated by the thermocouple in opposition to said direct current voltages, means including a potential divider connected across the output circuit of the amplifier and to the control element of said electronic device for adjusting the current within said heater coil, and a thermal reservoir surrounding said enclosed junction and arranged within the heater coil for introducing a predetermined time lag between the voltages generated by the detector element and the voltages generated by the thermocouple whereby direct current voltages of transient character only are recorded by said recording device.

4. In a system for electrically measuring and recording changing physical conditions, means for generating signals of magnitude proportionate to the changes in said physical conditions, means for amplifying said signals, means responsive to the amplified signals for recording the magnitude of the generated signals, thermoelectric means connected in series opposition with said signal generating means and adapted to generate countersignals of equal magnitude and opposite sign to the first named signals, means including a heater on said thermoelectric means and controlled by the amplified signals for adjusting said countersignals to substantial equality with the first named signals whereby steady signals of long duration generated by said signal generating means including a heat reservoir disposed intermediate said heater and said countersignal generating means are substantially cancelled, and means for causing a predetermined time delay between the generation of said first signals and the generation of said countersignals whereby signals of less than a predetermined duration are not cancelled and are recorded by said recording means.

5. In a recording system for selecting and recording transient signals within predetermined frequency limits, means for detecting said signals, means operatively connected to said detecting means for amplifying the signals, means for generating countersignals respectively opposing the detected signals and including a pair of thermocouple junctions connected in series with the detecting means and with the amplifying means, one of said junctions thereof being adapted to be differentially heated above the temperature of the second junction, a pair of heater coils respectively enclosing said junctions, means controlled by the amplified signals for selectively energizing said heater coils variably in accordance with the sign and strength of the amplified signals, a pair of heat reservoirs respectively disposed about said junctions and adapted to absorb and give up heat generated in the heater coils in time delayed relation with respect to the energization of the coils whereby detected signals of short duration are recorded and signals of longer duration are effectively opposed by said countersignals.

6. In a recording system of the character disclosed, a signal source, a direct current amplifier operatively connected to said source, a recording device connected to the output of the amplifier, an auxiliary circuit having a source of power, means including a thyratron operatively connected to the output of the amplifier and to said auxiliary circuit for controlling the flow of current in the circuit, means for adjusting the sensitivity of response of said thyratron to the output of the amplifier, a heater coil in said auxiliary circuit adapted to generate heat variably in response to said variable flow of power, a thermocouple connected in series opposition with said signal source and disposed in proximate relation to said heater coil and adapted to be heated thereby, thermal insulating means surrounding said thermocouple and heater coil for delaying the loss of heat therefrom, and means including a heat absorbing mass within said insulating means for delaying the rise and fall in temperature of the thermocouple as the current supplied to the heater coil is increased and decreased respectively at a rate sufficient to cause signals from said signal source to be substantially diminished when the signals are of low frequency and long duration and substantially undiminished when said signals are of high frequency and short duration.

7. In a recording system of the character disclosed, a signal source, a direct current amplifier operatively connected to said source, a recording device operatively connected to the output of the amplifier, means including a pair of thyratrons operatively connected to the output of the amplifier such that one thyratron is rendered variably conducting in accordance with the magnitude of an amplified positive signal from said source and the other thyratron is rendered variably conducting in accordance with the magnitude of an amplified negative signal from said source, a pair of thermocouples connected to the signal source in series therewith in such polarity that the heating of one of the thermocouples generates a signal opposing a positive signal from the signal source and the heating of the other thermocouple generates a signal opposing a negative signal from the signal source, means including an adjustable source of A. C. power and a pair of heater coils respectively surrounding said thermocouples and respectively connected through said thyratrons to said power source for variably and selectively heating one of the thermocouples in proportion to the magnitude of a positive amplified signal and the other one of the thermocouples in proportion to the magnitude of a negative amplified signal whereby the thyratrons control said opposing signals from the thermocouples, means operable at will for initially adjusting said source of power sufficiently to bring the magnitude of the opposing signals into equilibrium with signals from said signal source whereby signals of predetermined duration of either sign are cancelled and prevented from being recorded, and heat reservoir means surrounding said thermocouples for delaying generation of the opposing signals.

8. In a recording system including a signal detector, an auxiliary circuit, means responsive to the signal detected for controlling the flow of current within said auxiliary circuit in proportion to the magnitude of the signal, means included within the auxiliary circuit for heating a thermocouple in response to said flow of current in delayed time relation therewith, a junction within said thermocouple and connected to generate a signal in opposition to said detected signal when the junction is heated by said heating means, means for equalizing the magnitudes of the detected signal and the opposing signal when the signals have reached a steady state, and means including a thermal reservoir within said heating means for preventing equalization of the detected signal and the opposing signal for a predetermined time interval after a change in magnitude of the signal has been detected.

9. In a signal recording device of the character disclosed, means for generating signals responsive to the changes of ambient field in the vicinity thereof, signal amplifying means operatively connected to said generating means, signal recording means connected to the output of said amplifying means, a heating element, valve means for controlling the generation of heat in said heating element, said valve means including a control element operatively connected to said amplifying means output and selectively responsive in accordance with the magnitude of the amplified signals, a heat generating circuit comprising a power source and said heating element connected thereto through said valve means, thermal responsive means controlled by said heating element for generating opposing signals in said first named means in proportion to the magnitude of said first named signals, means for delaying the response of said thermal responsive means for a predetermined period of time after each of said changes in the ambient field whereby generated signals of short duration are amplified and recorded substantially unchanged by said opposing signals, and potentiometer means included in the connection between the amplifying means and the valve control element for adjusting the degree of response of said valve means to the amplified signal such that changes in the ambient field of long duration are substantially nulled.

10. In a system of the character disclosed, a circuit comprising a detector adapted to generate signals corresponding to changes in the ambient field and connected to an amplifier, a recorder element connected to the amplifier output for recording the amplified signals, means including a thermal junction and a normally open heating circuit therefor for feeding back into the detector circuit opposing signals substantially equal in magnitude to said generated signals and in time delayed relation thereto whereby the generated signals are cancelled without appreciable amplification thereof when the generated signals change at less than a predetermined rate, means including a thermionic tube operatively connected to the output of the amplifier for closing said heating circuit selectively in accordance with the strength of the amplified signals, means for retarding the operation of said feedback means for a predetermined interval after the heating circuit has been closed whereby signals having greater than a predetermined rate of change are amplified substantially without cancellation thereof, and means for recording said amplified signals.

11. In a signal recording system of the character disclosed, a detector circuit comprising a detector element adapted to generate signals corresponding to changes in the ambient field, said circuit being connected to the input of an amplifier, a second signal generating means comprising at least one thermocouple included in said detector circuit, electroresponsive means for heating the thermocouple, means for selectively operating said electroresponsive means in accordance with the amplitude of the amplified signals, said second signal generating means comprising a thermal time delay element whereby the second signal generating means is responsive to detected signals of low rates of change and substantially nonresponsive to signals of higher rates of change, means for adjusting the strength of signal from the second signal generating means to equality with the detected signals of said low rates of change, means for cancelling the detected signals of said low rates of change before amplification thereof, and means for recording the detected and amplified signals of said higher rates of change.

12. A thermoelectric device comprising a thermocouple junction, a heat reservoir enclosing said junction and electrically insulated therefrom, a heater coil surrounding and electrically insulated from said reservoir and having a pair of control conductors extending therefrom for heating the heater coil at a predetermined rate when the conductors are connected to a source of power, and thermal insulation enclosing said heater coil and reservoir wherein the rate of heat loss when the power is disconnected from said conductors approximates said predetermined rate of heating within a predetermined temperature range.

13. In a thermoelectric feedback device for injecting a voltage into a circuit in accordance with the differential heating of a pair of heater coils controlled by the circuit, in combination, a pair of thermal junctions consisting of a thermoelectrically positive wire common to both junctions and a pair of thermoelectrically negative wires having one end of each of the negative wires respectively joined to opposite ends of said positive wire, a pair of thermal reservoirs respectively surrounding said junctions in heat conducting relation thereto, a pair of heater coils respectively surrounding said reservoirs in heat conducting relation thereto, and means for differentially energizing said coils.

14. In a detecting and recording system for signals of a predetermined frequency range, a detecting circuit having means for detecting for said signals, a signal amplifying device operatively connected to the detecting circuit, a recording device operatively connected to the output of said amplifying device, a filter circuit comprising a plurality of thermocouples connected in series opposing within said detecting circuit, a plurality of thyratrons having control elements respectively connected in mutually opposed relationship to the output of said amplifying device, means operatively connected to said thyratrons for differentially heating said thermocouples selectively in proportion to the magnitude and sign of long period detected signals applied to said control elements, and a plurality of heat reservoirs respectively disposed on said thermocouples for preventing rapid changes of temperature thereof whereby detected signals of long periods are substantially filtered by said filter circuit.

WILLIAM G. KECK.
SAM A. FRY.

REFERENCES CITED

The following references are of record in the file of this patent:

UNITED STATES PATENTS

| Number | Name | Date |
|---|---|---|
| 1,156,412 | Lincoln | Oct. 12, 1915 |
| 2,122,262 | Nergaard | June 28, 1938 |
| 2,281,644 | Weathers | May 5, 1942 |
| 2,307,790 | Hoover | Jan. 12, 1943 |